(12) United States Patent
Sitik et al.

(10) Patent No.: US 10,452,717 B2
(45) Date of Patent: Oct. 22, 2019

(54) TECHNOLOGIES FOR NODE-DEGREE BASED CLUSTERING OF DATA SETS

(71) Applicant: Intel Corporation, Santa Clara, CA (US)

(72) Inventors: Ahmet Can Sitik, Hillsboro, OR (US); Ankit More, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 15/272,976

(22) Filed: Sep. 22, 2016

(65) Prior Publication Data

US 2018/0081986 A1    Mar. 22, 2018

(51) Int. Cl.
*G06F 16/901* (2019.01)
*G06N 20/00* (2019.01)
*G06N 5/02* (2006.01)

(52) U.S. Cl.
CPC ......... *G06F 16/9024* (2019.01); *G06N 5/022* (2013.01); *G06N 20/00* (2019.01)

(58) Field of Classification Search
CPC ..... G06F 16/9024; G06N 20/00; G06N 5/022
USPC ......................................................... 707/737
See application file for complete search history.

(56) References Cited

U.S. PATENT DOCUMENTS 5,461,698 A * 10/1995 Schwanke ............ G06N 3/04
                                                                 706/20
10,009,363 B2 * 6/2018 Modani ............... H04L 63/1425

2012/0078719 A1    3/2012 Bhagwan et al.
2014/0037227 A1 * 2/2014 Zhang ................. G06K 9/6219
                                                                 382/286
2016/0071233 A1    3/2016 Macko et al.
2016/0132521 A1    5/2016 Reininger et al.
(Continued)

FOREIGN PATENT DOCUMENTS

EP          3038024 A1       6/2016

OTHER PUBLICATIONS

Har-Peled, Sariel. "Chapter 6: Approximation Algorithms". Published Dec. 10, 2013. Accessed Feb. 2, 2019 from <https://courses.engr.illinois.edu/cs573/fa2013/lec/lec/06_approx_I.pdf> (Year: 2013).*
(Continued)

*Primary Examiner* — Robert W Beausoliel, Jr.
*Assistant Examiner* — Arthur Ganger
(74) *Attorney, Agent, or Firm* — Barnes & Thornburg LLP

(57) ABSTRACT

Technologies for node-degree based clustering include a computing device to construct a graph that includes multiple vertices corresponding to the data points of a data set. The computing device inserts an edge between each pair of vertices that has a corresponding similarity metric that meets a predetermined threshold similarity metric. The computing device determines a node degree for each vertex in the graph and initializes a cutoff node degree as the lowest node degree of the vertices. The computing device selects a test subset of the graph that includes vertices having a node degree less than or equal to the cutoff node degree. The computing device determines whether the test subset covers the graph and if not increases the cutoff node degree. If the test subset covers the graph, the data points corresponding to the vertices of the test subset are the representative cluster. Other embodiments are described and claimed.

24 Claims, 4 Drawing Sheets

(56) References Cited

U.S. PATENT DOCUMENTS

2018/0089580 A1* 3/2018 Fu .......................... G06N 7/005

OTHER PUBLICATIONS

International search report for PCT application No. PCT/US2017/047326, dated Feb. 26, 2018 (3 pages).
Written opinion for PCT application No. PCT/US2017/047326, dated Feb. 26, 2018 (4 pages).

* cited by examiner

TECHNOLOGIES FOR NODE-DEGREE BASED CLUSTERING OF DATA SETS

STATEMENT REGARDING FEDERALLY SPONSORED RESEARCH

This invention was made with Government support under contract number B608115-00-0-0000-0116 awarded by the Department of Energy. The Government has certain rights in this invention.

BACKGROUND

Clustering algorithms may be used to cluster a data set into two subsets, a representative subset of the data space and a residual subset. Such clustering algorithms may be used in image processing for data compression, in analytical modeling to identify a representative cluster that can be used as a training set for machine learning, or other applications. Typical clustering algorithms may produce a representative subset that does not cover all corner cases in the data set.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
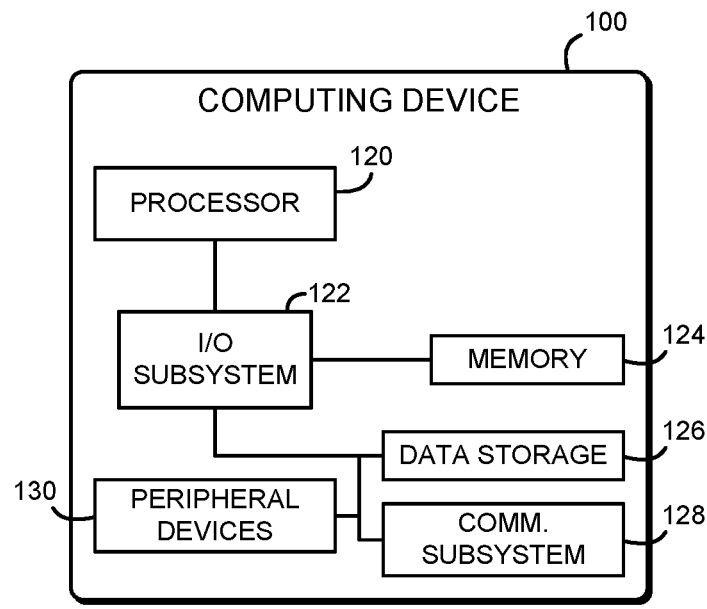
FIG. 1 is a simplified block diagram of at least one embodiment of a computing device for node-degree based clustering.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 may be used for node-degree based clustering. In use, as described further below, the computing device 100 constructs a graph that includes a vertex for each data point in the data set and inserts an edge in the graph between each pair of vertices that have a similarity factor above a predefined threshold. The computing device 100 selects all vertices having the lowest node degree and determines if those vertices cover the entire graph. The computing device 100 increases the cutoff node degree and re-selects vertices with the increased cutoff node degree until a set of vertices that cover the entire graph is found. That set of vertices corresponds to the representative cluster of the data set. The computing device 100 generates a representative cluster that includes all of the outliers of the data set. Thus, the representative cluster generated by the computing device 100 may be used as a representative training set to improve accuracy in machine learning applications. For example, the performance of processors or other hardware components may be simulated extensively during development. The computing device 100 may generate a representative cluster of test cases to be simulated, reducing the overall simulation time compared to simulating all test cases, while also ensuring that the corner cases or other outliers are adequately simulated. Thus, the computing device 100 may improve simulation performance and thereby improve the hardware component design process. As another example, the computing device 100 may generate training sets that may be used to generate system models for runtime scheduling, power management, or other resource management applications. It is important that such models cover a wide variety of workloads and thus it is important for such applications to use a truly representative training set. Accordingly, the system models generated using the training sets generated by the computing device 100 may provide improved coverage for corner cases with small training set sizes and thus may improve the performance of computer operating systems or other resource management systems.

Figure 7:
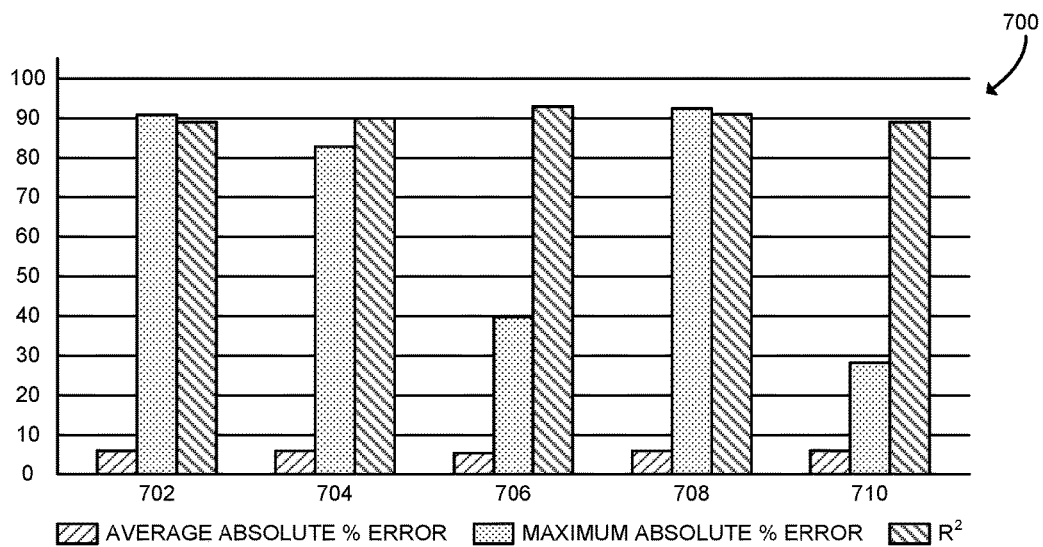
FIG. 7 is a plot comparing illustrative results for various clustering algorithms.

Referring now to FIG. 7, plot 700 shows illustrative clustering results that may be achieved with several clustering algorithms. In particular, the plot 700 illustrates average absolute percentage error, maximum absolute percentage error, and R-squared values for the representative cluster produced by each clustering algorithm. Results 702, 704, 706, and 708 represent existing algorithms, and results 710 represent the node-degree based clustering algorithm of this disclosure. In particular, results 702 represent a random clustering algorithm, results 704 represent a k-means clustering algorithm, and results 706, 708 both represent a correlation-based clustering algorithm as described in Ailon et al., *Aggregating Inconsistent Information: Ranking and Clustering*, in Journal of the ACM (JACM), vol. 55, issue 5, article no. 23 (October 2008). The correlation-based clustering algorithm includes random sampling of the data set, and therefore the particular results achieved by the correlation-based clustering algorithm may not be predictable ahead of time. Accordingly, results 706 represent best-case sampling and results 708 represent worst-case sampling.

As shown in FIG. 7, the results 710 of the present disclosure include average absolute percentage error values and R-squared values that are close to the results 702, 704, 706, 708 of the existing algorithms. In particular, the average absolute percentage error value may be between 5.5% and 6.1% for all algorithms, and the R-squared value may be between 0.89 and 0.93 for all algorithms. However, the results 710 include significantly lower maximum absolute percentage error than the other results 702, 704, 706, 708, indicating that the node-based clustering algorithm of the present disclosure is better at including outliers in the training set than the existing algorithms In particular, the maximum absolute percentage error for this disclosure may be 28.2%, compared to 90.9% for the random algorithm, 82.8% for the k-means algorithm, 39.8% for the best-case correlation-based algorithm, and 92.5% for the worst-case correlation-based algorithm. Additionally, the node-degree based algorithm of the present disclosure is determinative and predictable, unlike the correlation-based algorithm. In other words, for a particular data set, the algorithm of the present disclosure may provide a predictable maximum absolute percentage error of 28.2%, whereas the correlation-based algorithm may provide a maximum absolute percentage error anywhere between 39.8% and 92.5%.

Referring back to FIG. 1, the computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or other peripheral devices.

Figure 2:
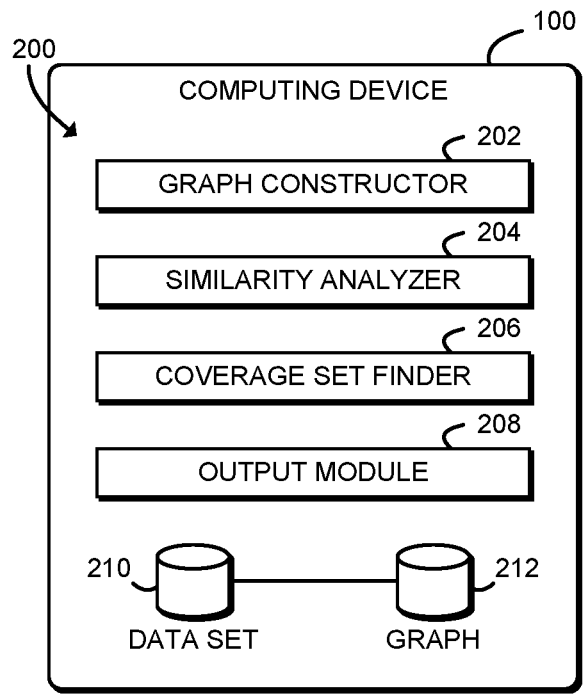
FIG. 2 is a simplified block diagram of an environment that may be established by a computing device of FIG. 1.

Referring now to FIG. 2, in an illustrative embodiment, the computing device 100 establishes an environment 200 during operation. The illustrative environment 200 includes a graph constructor 202, a similarity analyzer 204, a coverage set finder 206, and an output module 208. The various components of the environment 200 may be embodied as hardware, firmware, software, or a combination thereof. As such, in some embodiments, one or more of the components of the environment 200 may be embodied as circuitry or collection of electrical devices (e.g., graph constructor circuitry 202, similarity analyzer circuitry 204, coverage set finder circuitry 206, and/or output module circuitry 208). It should be appreciated that, in such embodiments, one or more of the graph constructor circuitry 202, the similarity analyzer circuitry 204, the coverage set finder circuitry 206, and/or the output module circuitry 208 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The graph constructor 202 is configured to construct a graph 212. The graph 212 includes multiple graph vertices, and each graph vertex corresponds to a data point of a data set 210. The graph constructor 202 is further configured to insert an edge in the graph 212 between each pair of graph vertices having a similarity metric with a predetermined relationship to a predetermined threshold similarity metric. The predetermined relationship may be, for example, greater than, greater than or equal to, less than, or any other appropriate relationship.

The similarity analyzer 204 is configured to determine the similarity metric between each pair of graph vertices. The similarity metric may be embodied as, for example, a correlation coefficient between each pair of graph vertices, a Euclidean distance between each pair of graph vertices, or other measure of similarity. The edges may be inserted in the graph 212 in response to determining the similarity metric.

The coverage set finder 206 is configured to initialize a cutoff node degree as a lowest node degree of the graph vertices of the graph 212 and select a test subset of graph vertices from the graph 212 that each have a node degree that is less than or equal to the cutoff node degree. The node degree associated with each graph vertex corresponds to a number of edges that connect to the associated graph vertex. The coverage set finder 206 may be configured to sort the graph vertices in a non-decreasing order based on the associated node degree. The coverage set finder 206 is further configured to determine whether the test subset covers the graph 212 and to increase the cutoff node degree in response to determining that the test subset does not cover the graph 212. After increasing the cutoff node degree, the coverage set finder 206 may re-select the test subset and re-determine whether the test subset covers the graph 212.

The output module 208 is configured to output a representative cluster of data points in response determining that the test subset covers the graph 212. The representative cluster includes all data points of the data set 210 that correspond to the graph vertices of the test subset. The output module 208 may be further configured to output a residual cluster of data points in response to determining that the test subset covers the plurality of graph vertices. The residual cluster includes all data points of the data set 210 that correspond to graph vertices of the graph 212 that are not included in the test subset.

Figure 3:
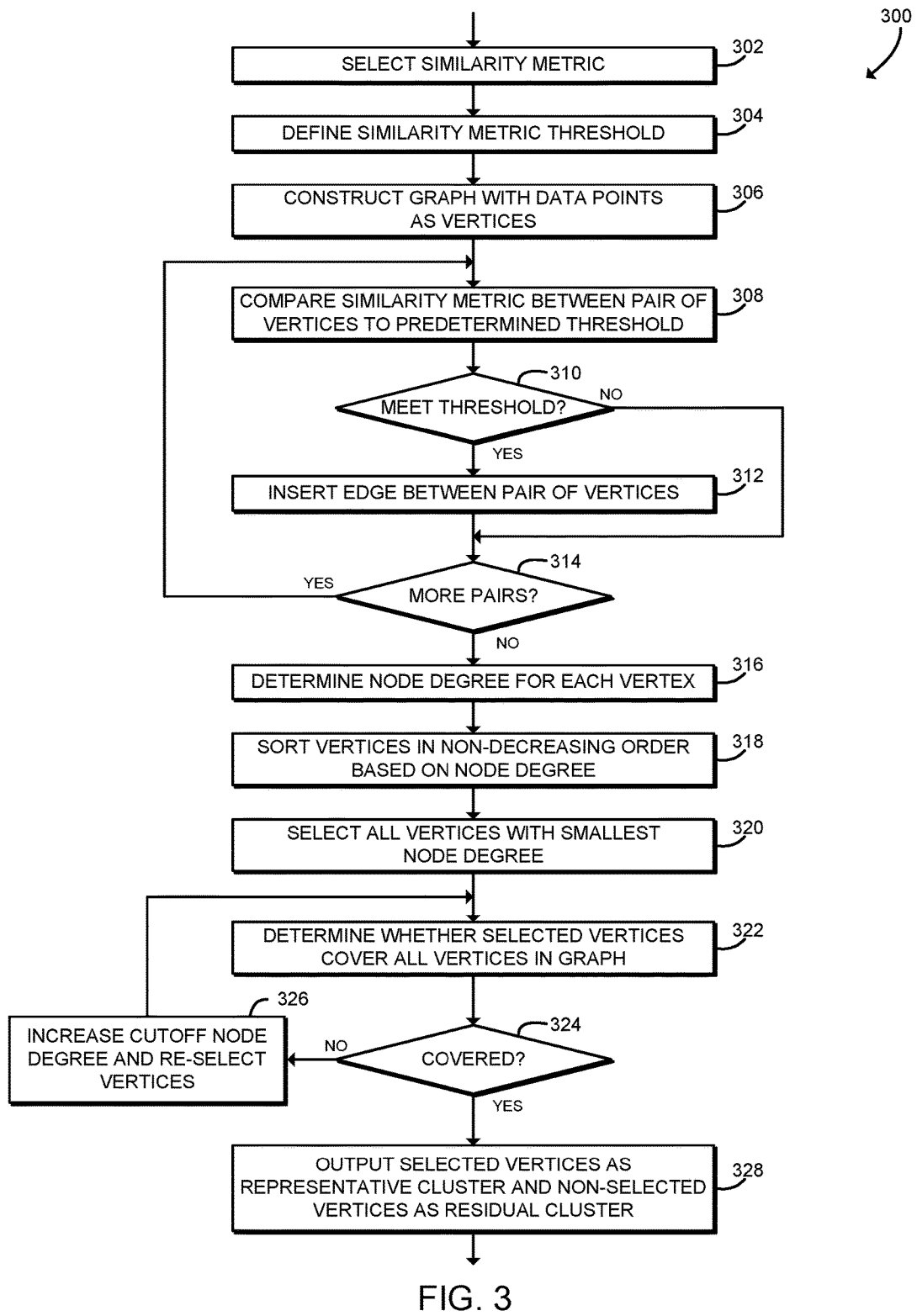
FIG. 3 is a simplified flow diagram of at least one embodiment of a method for node-degree based clustering that may be executed by a computing device of FIGS. 1-2.

Referring now to FIG. 3, in use, the computing device 100 may execute a method 300 for node-degree based clustering. It should be appreciated that, in some embodiments, the operations of the method 300 may be performed by one or more modules of the environment 200 of the computing device 100 as shown in FIG. 2. The method 300 begins in block 302, in which the computing device 100 selects a similarity metric. The computing device 100 may select any similarity metric that may be used to determine the degree of similarity between data points in the data set 210. For example, the similarity metric may be embodied as a correlation coefficient, a Euclidean distance value, or other metric. In block 304, the computing device 100 defines a similarity metric threshold. The similarity metric threshold defines a value of the similarity metric that may be used to determine whether a pair of data points in the data set 210 are considered as similar. For example, in some embodiments, the similarity metric threshold may be defined as a correlation coefficient equal to 0.95. As described below in connection with FIG. 6, the particular similarity metric threshold selected may determine a trade-off between representative cluster size and accuracy. Additionally, although illustrated as selecting the similarity metric and defining the similarity metric threshold during execution of the method 300, it should be understood that the similarity metric and/or the similarity metric threshold may be pre-selected, pre-configured, hardcoded, or otherwise determined at another time.

In block 306, the computing device 100 constructs the graph 212 based on the data set 210. The computing device 100 inserts a vertex into the graph 212 for each data point of the data set 210. In block 308, the computing device 100 compares the similarity metric between a pair of vertices to the predetermined similarity metric threshold. In block 310, the computing device 100 determines whether the similarity metric meets the threshold. For example, the computing device 100 may determine whether the correlation coefficient between a pair of vertices is greater than a threshold of 0.95. Of course, in other embodiments the computing device 100 may determine whether any appropriate predetermined relationship exists between the similarity metric and the similarity metric threshold (e.g., whether the similarity metric is greater than the threshold, less than the threshold, equal to the threshold, etc.). If the similarity metric does not meet the similarity metric threshold, the method 300 branches ahead to block 314, described below. If the similarity metric meets the similarity metric threshold, the method 300 advances to block 312, in which the computing device 100 inserts an edge into the graph 212 between the pair of vertices. In block 314, the computing device 100 determines whether additional pairs of vertices exist in the graph 212. If so, the method 300 loops back to block 308 to continue processing pairs of vertices. If all pairs of vertices in the graph 212 have been processed, the method 300 advances to block 316.

In block 316, the computing device 100 determines a node degree for each vertex in the graph 212. The node degree of a vertex represents the number of edges in the graph 212 that end at that vertex. In block 318, the computing device 100 sorts the vertices in the graph 212 in non-decreasing order based on the corresponding node degree. In block 320, the computing device 100 selects all vertices in the graph 212 having the smallest node degree. For example, the computing device 100 may select the vertices from the beginning of the sorted list of vertices, using the smallest node degree as a cutoff.

In block 322, the computing device 100 determines whether the selected vertices cover all vertices in the graph 212. A subset of a graph covers the graph when all edges of the graph have at least one endpoint in the subset. In other words, the subset covers the graph when all vertices in the graph are either in the subset or within one edge of a vertex in the subset. In block 324, the computing device 100 checks whether the graph 212 is covered. If not, the method 300 branches to block 326, in which the computing device 100 increases the cutoff node degree and re-selects vertices that satisfy the increased cutoff node degree. The computing device 100 may, for example, select additional vertices from the sorted list of vertices that have the next-smallest node degree. After increasing the cutoff node degree of the vertex selection criteria (and thereby increasing the number of selected vertices), the method 300 loops back to block 322 to determine whether the enlarged subset of selected vertices covers the graph 212.

Referring back to block 324, if the subset of selected vertices covers the entire graph 212, the method 300 advances to block 328. In block 328, the computing device 100 outputs the selected vertices as the representative cluster and the non-selected vertices as the residual cluster. In other words, the data points in the data set 210 corresponding to the selected vertices are the representative cluster, and the data points in the data set 210 corresponding to the non-selected vertices are the residual cluster. After outputting the representative cluster and the residual cluster, the method 300 is completed. The computing device 100 may use the representative cluster, for example, as a training set for one or more machine learning applications or otherwise use the representative cluster. The method 300 may be repeated, for example to determine representative clusters for additional data sets 210.

Figure 4:
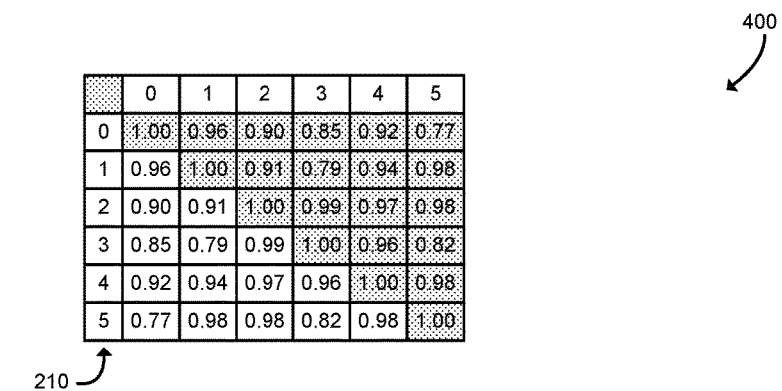
FIG. 4 is a tabular diagram illustrating similarity metrics for a sample data set.

Referring now to FIG. 4, table 400 illustrates similarity metrics that may be calculated between data points of an illustrative data set 210. In particular, the table 400 illustrates a correlation matrix for the data set 210. As shown, the illustrative data set 210 includes six data points, labeled 0 through 5. The table 400 includes a correlation coefficient between each pair of data points. As shown in FIG. 4, because the correlation matrix is symmetrical, the computing device 100 may only consider correlation coefficients in the lower triangle below the main diagonal of the table 400.

Figures 5A, 5B:
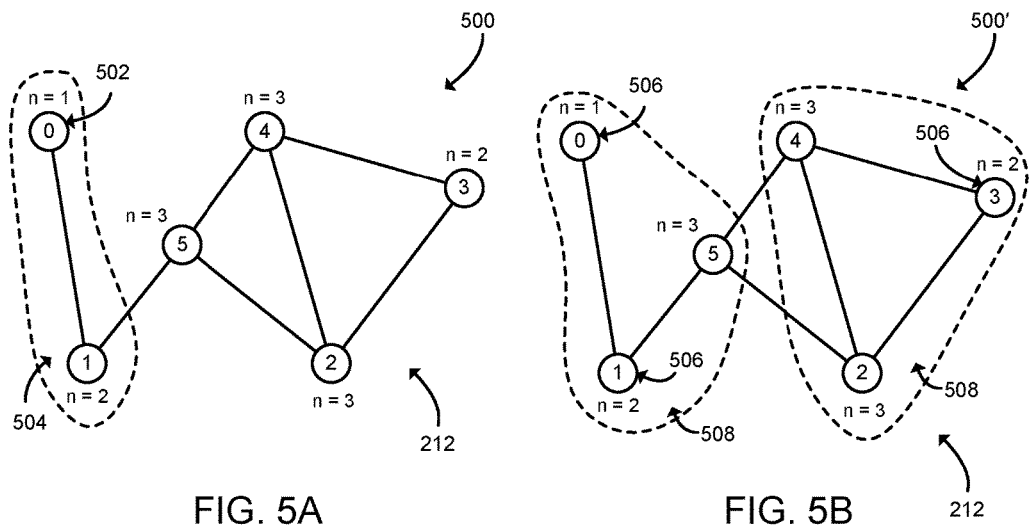
FIGS. 5A and 5B are schematic diagrams of a graph that may be generated based on the sample data set of FIG. 4.

Referring now to FIGS. 5A and 5B, diagrams 500, 500' illustrates a graph 212 that may be generated based on the illustrative data set 210 of FIG. 4. As shown, the graph 212 includes a vertex for each data point 0 through 5 of the data set 210. As described above in connection with blocks 308 through 312 of FIG. 3, the computing device 100 inserts an edge between each vertex having a similarity metric that is above the similarity metric threshold. In the illustrative embodiment, the similarity metric threshold is 0.95. Therefore, as shown in FIGS. 5A and 5B, edges have been inserted between vertices 0 and 1, 1 and 5, 2 and 3, 2 and 4, 2 and 5, 3 and 4, and 4 and 5. As described above in connection with block 316 of FIG. 3, the computing device 100 determines a node degree for each vertex. As shown in FIGS. 5A and 5B, in the illustrative embodiment, vertex 0 has a node degree of 1, vertex 1 has a node degree of 2, vertex 2 has a node degree of 3, vertex 3 has a node degree of 2, vertex 4 has a node degree of 3, and vertex 5 has a node degree of 3.

As described above in connection with blocks 318, 320, the computing device 100 sorts the vertices in non-decreasing order based on node degree and selects all vertices with the smallest node degree. As shown in FIG. 5A, in the illustrative embodiment the vertex 0 has the smallest node degree of 1. Therefore, the computing device 100 selects a set 502 that includes only the vertex 0. As described above in connection with blocks 322, 324 of FIG. 3, the computing device 100 determines whether the set 502 covers the graph 212. To determine whether the set 502 covers the graph 212, the computing device 100 may identify all vertices that are connected by an edge to a vertex within the set 502. As shown in FIG. 5A, the set 502 (i.e., the vertex 0) has a coverage set 504 that includes only the vertices 0 and 1. As shown, the coverage set 504 for the set 502 does not include the entire graph 212.

As described above in connection with blocks 324, 326 of FIG. 3, if the entire graph 212 is not covered, the computing device 100 increases the cutoff node degree of the selected vertices and determines whether the selected vertices cover the entire graph 212. As shown in the diagram 500' of FIG. 5B, after incrementing the cutoff node degree to the next value of 2, the computing device 100 selects a set 506 that includes the vertices 0, 1, and 3. As shown in FIG. 5B, the set 506 has a coverage set 508 that includes the entire graph 212. In particular, the vertex 5 is connected by an edge to the vertex 1, which is within the set 506, and the vertices 4 and 2 are each connected by an edge to the vertex 3, which is also within the set 506. As described above in connection with block 328 of FIG. 3, because the set 506 covers the entire graph 212, the vertices of the set 506 may be output as the representative cluster of the data set 210, and the vertices not within the set 506 may be output as the residual cluster. In other words, in the illustrative example the representative cluster of the data set 210 includes the data points 0, 1, and 3, and the residual cluster includes the data points 2, 4, and 5.

Figure 6:
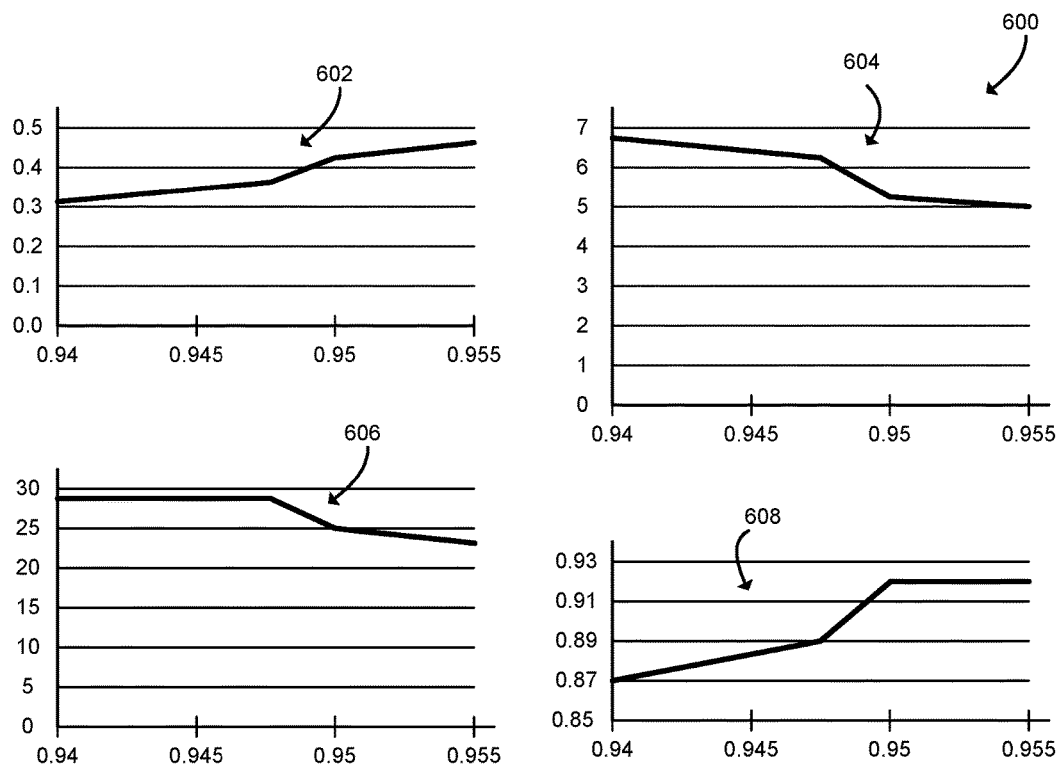
FIG. 6 is a collection of plots illustrating clustering performance for various similarity factor thresholds.

Referring now to FIG. 6, diagram 600 shows several plots illustrating the effects of varying the similarity metric threshold. In the illustrative embodiment, the similarity metric is a correlation coefficient, and the similarity metric threshold is varied through a range from 0.94 to 0.955. As shown, varying the similarity metric threshold may allow for adjusting a trade-off between a training set size (i.e., a representative cluster size) and clustering accuracy. Adjusting the similarity metric threshold may be used to adjust a model to target higher accuracy in exchange for a larger training set (or vice versa).

Plot 602 illustrates training set ratio versus correlation coefficient. As shown, the training set ratio (the ratio of the size of the training set compared to the size of the data set) may be changed from about 32% to about 47%. Plot 604 illustrates average absolute percent error versus correlation coefficient. As shown, the average absolute percent error may be changed from about 7% to about 5%. Plot 606 illustrates maximum absolute percent error versus correlation coefficient. As shown, the maximum absolute percent error may be changed from about 30% to about 23%. Plot 608 illustrates R-squared versus correlation coefficient. As shown, R-squared may be changed from about 0.87 to about 0.92

It should be appreciated that, in some embodiments, the method 300 may be embodied as various instructions stored on a computer-readable media, which may be executed by the processor 120, the I/O subsystem 122, and/or other components of the computing device 100 to cause the computing device 100 to perform the method 300. The computer-readable media may be embodied as any type of media capable of being read by the computing device 100 including, but not limited to, the memory 124, the data storage device 126, firmware devices, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for clustering a data set, the computing device comprising: a graph constructor to (i) construct a graph that includes a plurality of graph vertices, wherein each graph vertex corresponds to a data point of a data set, and (ii) insert an edge in the graph between each pair of graph vertices that has a corresponding similarity metric with a predetermined relationship to a predetermined threshold similarity metric; a coverage set finder to (i) initialize a cutoff node degree as a lowest node degree of the graph vertices of the graph, (ii) select a test subset of graph vertices from the graph, wherein each graph vertex of the test subset is associated with a node degree that is less than or equal to the cutoff node degree, (iii) determine whether the test subset covers the graph, and (iv) increase the cutoff node degree in response to a determination that the test subset does not cover the graph; and an output module to output a representative cluster of data points in response to determination that the test subset covers the graph, wherein the representative cluster includes all data points of the data set that correspond to the graph vertices of the test subset.

Example 2 includes the subject matter of Example 1, and wherein the output module is further to output a residual cluster of data points in response to the determination that the test subset covers the plurality of graph vertices, wherein the residual cluster includes all data points of the data set that correspond to graph vertices of the graph that are not included in the test subset.

Example 3 includes the subject matter of any of Examples 1 and 2, and wherein the node degree associated with each graph vertex corresponds to a number of edges that connect to the associated graph vertex.

Example 4 includes the subject matter of any of Examples 1-3, and wherein: the coverage set finder is further to determine the node degree associated with each graph vertex of the graph; and to initialize the cutoff node degree comprises to initialize the node degree in response to a determination of the node degree associated with each graph vertex.

Example 5 includes the subject matter of any of Examples 1-4, and wherein: the coverage set finder is further to sort the graph vertices in a non-decreasing order based on the associated node degree in response to the determination of the node degree associated with each graph vertex; and to initialize the cutoff node degree further comprises to initialize the cutoff node degree in response to a sorting of the graph vertices.

Example 6 includes the subject matter of any of Examples 1-5, and wherein the coverage set finder is further to re-select the test subset of graph vertices in response to an increase of the cutoff node degree.

Example 7 includes the subject matter of any of Examples 1-6, and further comprising: a similarity analyzer to determine a similarity metric between each pair of graph vertices; wherein to insert an edge in the graph further comprises to insert an edge in the graph in response to a determination of the similarity metric between each pair of graph vertices.

Example 8 includes the subject matter of any of Examples 1-7, and wherein the similarity metric comprises a correlation coefficient between each pair of graph vertices.

Example 9 includes the subject matter of any of Examples 1-8, and wherein the similarity metric comprises a Euclidean distance between each pair of graph vertices.

Example 10 includes the subject matter of any of Examples 1-9, and wherein the predetermined relationship to the predetermined threshold similarity metric comprises greater than or equal to the predetermined threshold similarity metric.

Example 11 includes the subject matter of any of Examples 1-10, and wherein the predetermined relationship to the predetermined threshold similarity metric comprises less than or equal to the predetermined threshold similarity metric.

Example 12 includes the subject matter of any of Examples 1-11, and wherein to determine whether the test subset covers the graph comprises to determine whether each edge of the graph connects to at least one graph vertex of the test subset.

Example 13 includes a method for clustering a data set, the method comprising: constructing, by a computing device, a graph that includes a plurality of graph vertices, wherein each graph vertex corresponds to a data point of a data set; inserting, by the computing device, an edge in the graph between each pair of graph vertices that has a corresponding similarity metric with a predetermined relationship to a predetermined threshold similarity metric; initializing, by the computing device, a cutoff node degree as a lowest node degree of the graph vertices of the graph; selecting, by the computing device, a test subset of graph vertices from the graph, wherein each graph vertex of the test subset is associated with a node degree that is less than or equal to the cutoff node degree; determining, by the computing device, whether the test subset covers the graph; increasing, by the computing device, the cutoff node degree in response to determining that the test subset does not cover the graph; and outputting, by the computing device, a representative cluster of data points in response to determining that the test subset covers the graph, wherein the representative cluster includes all data points of the data set that correspond to the graph vertices of the test subset.

Example 14 includes the subject matter of Example 13, and further comprising outputting, by the computing device, a residual cluster of data points in response to determining that the test subset covers the plurality of graph vertices, wherein the residual cluster includes all data points of the data set that correspond to graph vertices of the graph that are not included in the test subset.

Example 15 includes the subject matter of any of Examples 13 and 14, and wherein the node degree associated with each graph vertex corresponds to a number of edges that connect to the associated graph vertex.

Example 16 includes the subject matter of any of Examples 13-15, and further comprising: determining, by the computing device, the node degree associated with each graph vertex of the graph; wherein initializing the cutoff node degree comprises initializing the node degree in response to determining the node degree associated with each graph vertex.

Example 17 includes the subject matter of any of Examples 13-16, and further comprising: sorting, by the computing device, the graph vertices in a non-decreasing order based on the associated node degree in response to determining the node degree associated with each graph vertex; wherein initializing the cutoff node degree further comprises initializing the cutoff node degree in response to sorting the graph vertices.

Example 18 includes the subject matter of any of Examples 13-17, and further comprising re-selecting, by the computing device, the test subset of graph vertices in response to increasing the cutoff node degree.

Example 19 includes the subject matter of any of Examples 13-18, and further comprising: determining, by the computing device, a similarity metric between each pair of graph vertices; wherein inserting an edge in the graph further comprises inserting an edge in the graph in response to determining the similarity metric between each pair of graph vertices.

Example 20 includes the subject matter of any of Examples 13-19, and wherein determining the similarity metric between each pair of graph vertices comprises determining a correlation coefficient between each pair of graph vertices.

Example 21 includes the subject matter of any of Examples 13-20, and wherein determining the similarity metric between each pair of graph vertices comprises determining a Euclidean distance between each pair of graph vertices.

Example 22 includes the subject matter of any of Examples 13-21, and wherein inserting an edge in the graph between each pair of graph vertices that has a corresponding similarity metric with the predetermined relationship to the predetermined threshold similarity metric comprises inserting an edge in the graph between each pair of graph vertices that has a corresponding similarity metric greater than or equal to the predetermined threshold similarity metric.

Example 23 includes the subject matter of any of Examples 13-22, and wherein inserting an edge in the graph between each pair of graph vertices that has a corresponding similarity metric with the predetermined relationship to the predetermined threshold similarity metric comprises inserting an edge in the graph between each pair of graph vertices that has a corresponding similarity metric less than or equal to the predetermined threshold similarity metric.

Example 24 includes the subject matter of any of Examples 13-23, and wherein determining whether the test subset covers the graph comprises determining whether each edge of the graph connects to at least one graph vertex of the test subset.

Example 25 includes a computing device comprising: a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for clustering a data set, the computing device comprising: means for constructing a graph that includes a plurality of graph vertices, wherein each graph vertex corresponds to a data point of a data set; means for inserting an edge in the graph between each pair of graph vertices that has a corresponding similarity metric with a predetermined relationship to a predetermined threshold similarity metric; means for initializing a cutoff node degree as a lowest node degree of the graph vertices of the graph; means for selecting a test subset of graph vertices from the graph, wherein each graph vertex of the test subset is associated with a node degree that is less than or equal to the cutoff node degree; means for determining whether the test subset covers the graph; means for increasing the cutoff node degree in response to determining that the test subset does not cover the graph; and means for outputting a representative cluster of data points in response to determining that the test subset covers the graph, wherein the representative cluster includes all data points of the data set that correspond to the graph vertices of the test subset.

Example 29 includes the subject matter of Example 28, and further comprising means for outputting a residual cluster of data points in response to determining that the test subset covers the plurality of graph vertices, wherein the residual cluster includes all data points of the data set that correspond to graph vertices of the graph that are not included in the test subset.

Example 30 includes the subject matter of any of Examples 28 and 29, and wherein the node degree associated with each graph vertex corresponds to a number of edges that connect to the associated graph vertex.

Example 31 includes the subject matter of any of Examples 28-30, and further comprising: means for determining the node degree associated with each graph vertex of the graph; wherein the means for initializing the cutoff node degree comprises means for initializing the node degree in response to determining the node degree associated with each graph vertex.

Example 32 includes the subject matter of any of Examples 28-31, and further comprising: means for sorting the graph vertices in a non-decreasing order based on the associated node degree in response to determining the node degree associated with each graph vertex; wherein the means for initializing the cutoff node degree further comprises means for initializing the cutoff node degree in response to sorting the graph vertices.

Example 33 includes the subject matter of any of Examples 28-32, and further comprising means for re-selecting the test subset of graph vertices in response to increasing the cutoff node degree.

Example 34 includes the subject matter of any of Examples 28-33, and further comprising: means for determining a similarity metric between each pair of graph vertices; wherein the means for inserting an edge in the graph further comprises means for inserting an edge in the graph in response to determining the similarity metric between each pair of graph vertices.

Example 35 includes the subject matter of any of Examples 28-34, and wherein the means for determining the similarity metric between each pair of graph vertices comprises means for determining a correlation coefficient between each pair of graph vertices.

Example 36 includes the subject matter of any of Examples 28-35, and wherein the means for determining the similarity metric between each pair of graph vertices comprises means for determining a Euclidean distance between each pair of graph vertices.

Example 37 includes the subject matter of any of Examples 28-36, and wherein the means for inserting an edge in the graph between each pair of graph vertices that has a corresponding similarity metric with the predetermined relationship to the predetermined threshold similarity metric comprises means for inserting an edge in the graph between each pair of graph vertices that has a corresponding similarity metric greater than or equal to the predetermined threshold similarity metric.

Example 38 includes the subject matter of any of Examples 28-37, and wherein the means for inserting an edge in the graph between each pair of graph vertices that has a corresponding similarity metric with the predetermined relationship to the predetermined threshold similarity metric comprises means for inserting an edge in the graph between each pair of graph vertices that has a corresponding similarity metric less than or equal to the predetermined threshold similarity metric.

Example 39 includes the subject matter of any of Examples 28-38, and wherein the means for determining whether the test subset covers the graph comprises means for determining whether each edge of the graph connects to at least one graph vertex of the test subset.

The invention claimed is:

1. A computing device for clustering a data set, the computing device comprising:
a graph constructor to (i) construct a graph that includes a plurality of graph vertices, wherein each graph vertex corresponds to a data point of a data set, and (ii) insert an edge in the graph between each pair of graph vertices that has a corresponding similarity metric with a predetermined relationship to a predetermined threshold similarity metric;
a coverage set finder to (i) initialize a cutoff node degree as a lowest node degree of the graph vertices of the graph, (ii) select a test subset of graph vertices from the graph, wherein each graph vertex of the test subset is associated with a node degree that is less than or equal to the cutoff node degree, (iii) determine whether the test subset covers the graph, and (iv) increase the cutoff node degree in response to a determination that the test subset does not cover the graph; and
an output module to output a representative cluster of data points in response to determination that the test subset covers the graph, wherein the representative cluster includes all data points of the data set that correspond to the graph vertices of the test subset.

2. The computing device of claim 1, wherein the output module is further to output a residual cluster of data points in response to the determination that the test subset covers the plurality of graph vertices, wherein the residual cluster includes all data points of the data set that correspond to graph vertices of the graph that are not included in the test subset.

3. The computing device of claim 1, wherein the node degree associated with each graph vertex corresponds to a number of edges that connect to the associated graph vertex.

4. The computing device of claim 1, wherein:
the coverage set finder is further to determine the node degree associated with each graph vertex of the graph; and
to initialize the cutoff node degree comprises to initialize the node degree in response to a determination of the node degree associated with each graph vertex.

5. The computing device of claim 4, wherein:
the coverage set finder is further to sort the graph vertices in a non-decreasing order based on the associated node degree in response to the determination of the node degree associated with each graph vertex; and
to initialize the cutoff node degree further comprises to initialize the cutoff node degree in response to a sorting of the graph vertices.

6. The computing device of claim 1, wherein the coverage set finder is further to re-select the test subset of graph vertices in response to an increase of the cutoff node degree.

7. The computing device of claim 1, further comprising:
a similarity analyzer to determine a similarity metric between each pair of graph vertices;
wherein to insert an edge in the graph further comprises to insert an edge in the graph in response to a determination of the similarity metric between each pair of graph vertices.

8. The computing device of claim 7, wherein the similarity metric comprises a correlation coefficient between each pair of graph vertices.

9. The computing device of claim 7, wherein the similarity metric comprises a Euclidean distance between each pair of graph vertices.

10. The computing device of claim 1, wherein to determine whether the test subset covers the graph comprises to determine whether each edge of the graph connects to at least one graph vertex of the test subset.

11. A method for clustering a data set, the method comprising:
constructing, by a computing device, a graph that includes a plurality of graph vertices, wherein each graph vertex corresponds to a data point of a data set;
inserting, by the computing device, an edge in the graph between each pair of graph vertices that has a corresponding similarity metric with a predetermined relationship to a predetermined threshold similarity metric;
initializing, by the computing device, a cutoff node degree as a lowest node degree of the graph vertices of the graph;
selecting, by the computing device, a test subset of graph vertices from the graph, wherein each graph vertex of the test subset is associated with a node degree that is less than or equal to the cutoff node degree;
determining, by the computing device, whether the test subset covers the graph;
increasing, by the computing device, the cutoff node degree in response to determining that the test subset does not cover the graph; and
outputting, by the computing device, a representative cluster of data points in response to determining that the test subset covers the graph, wherein the representative cluster includes all data points of the data set that correspond to the graph vertices of the test subset.

12. The method of claim 11, further comprising outputting, by the computing device, a residual cluster of data points in response to determining that the test subset covers the plurality of graph vertices, wherein the residual cluster includes all data points of the data set that correspond to graph vertices of the graph that are not included in the test subset.

13. The method of claim 11, further comprising:
determining, by the computing device, the node degree associated with each graph vertex of the graph;
wherein initializing the cutoff node degree comprises initializing the node degree in response to determining the node degree associated with each graph vertex.

14. The method of claim 13, further comprising:
sorting, by the computing device, the graph vertices in a non-decreasing order based on the associated node degree in response to determining the node degree associated with each graph vertex;
wherein initializing the cutoff node degree further comprises initializing the cutoff node degree in response to sorting the graph vertices.

15. The method of claim 11, further comprising re-selecting, by the computing device, the test subset of graph vertices in response to increasing the cutoff node degree.

16. The method of claim 11, further comprising:
determining, by the computing device, a similarity metric between each pair of graph vertices;
wherein inserting an edge in the graph further comprises inserting an edge in the graph in response to determining the similarity metric between each pair of graph vertices.

17. The method of claim 11, wherein determining whether the test subset covers the graph comprises determining whether each edge of the graph connects to at least one graph vertex of the test subset.

18. One or more non-transitory computer-readable storage media comprising a plurality of instructions that in response to being executed cause a computing device to:
construct a graph that includes a plurality of graph vertices, wherein each graph vertex corresponds to a data point of a data set; insert an edge in the graph between each pair of graph vertices that has a corresponding similarity metric with a predetermined relationship to a predetermined threshold similarity metric; initialize a cutoff node degree as a lowest node degree of the graph vertices of the graph; select a test subset of graph vertices from the graph, wherein each graph vertex of the test subset is associated with a node degree that is less than or equal to the cutoff node degree; determine whether the test subset covers the graph; increase the cutoff node degree in response to determining that the test subset does not cover the graph; and output a representative cluster of data points in response to determining that the test subset covers the graph, wherein the representative cluster includes all data points of the data set that correspond to the graph vertices of the test subset.

19. The one or more computer-readable storage media of claim 18, further comprising a plurality of instructions that in response to being executed cause the computing device to output a residual cluster of data points in response to determining that the test subset covers the plurality of graph vertices, wherein the residual cluster includes all data points of the data set that correspond to graph vertices of the graph that are not included in the test subset.

20. The one or more computer-readable storage media of claim 18, further comprising a plurality of instructions that in response to being executed cause the computing device to:
   determine the node degree associated with each graph vertex of the graph;
   wherein to initialize the cutoff node degree comprises to initialize the node degree in response to determining the node degree associated with each graph vertex.

21. The one or more computer-readable storage media of claim 20, further comprising a plurality of instructions that in response to being executed cause the computing device to:
   sort the graph vertices in a non-decreasing order based on the associated node degree in response to determining the node degree associated with each graph vertex;
   wherein to initialize the cutoff node degree further comprises to initialize the cutoff node degree in response to sorting the graph vertices.

22. The one or more computer-readable storage media of claim 18, further comprising a plurality of instructions that in response to being executed cause the computing device to re-select the test subset of graph vertices in response to increasing the cutoff node degree.

23. The one or more computer-readable storage media of claim 18, further comprising a plurality of instructions that in response to being executed cause the computing device to
   determine a similarity metric between each pair of graph vertices;
   wherein to insert an edge in the graph further comprises to insert an edge in the graph in response to determining the similarity metric between each pair of graph vertices.

24. The one or more computer-readable storage media of claim 18, wherein to determine whether the test subset covers the graph comprises to determine whether each edge of the graph connects to at least one graph vertex of the test subset.

* * * * *